United States Patent [19]
Ichimura et al.

[11] Patent Number: 6,097,688
[45] Date of Patent: Aug. 1, 2000

[54] RECORDING/REPRODUCING APPARATUS AND RECORDING/REPRODUCING METHOD FOR OPTICAL RECORDING MEDIA

[75] Inventors: Isao Ichimura, Kanagawa; Fumisada Maeda, Tokyo; Kenji Yamamoto, Saitama; Kiyoshi Ohsato, Chiba; Toshio Watanabe, Kanagawa; Atsushi Fukumoto, Kanagawa; Akira Suzuki, Kanagawa, all of Japan

[73] Assignee: Sony Corporation, Tokyo, Japan

[21] Appl. No.: 08/811,727

[22] Filed: Mar. 6, 1997

[30] Foreign Application Priority Data

Mar. 15, 1996 [JP] Japan .................................. 08-058870

[51] Int. Cl.⁷ ...................................................... G11B 7/09
[52] U.S. Cl. ..................... 369/112; 369/44.14; 369/44.23
[58] Field of Search .......................... 369/54, 112, 44.14, 369/43, 44.23; 359/664

[56] References Cited

U.S. PATENT DOCUMENTS 5,764,613 6/1998 Yamamoto et al. .............. 369/44.14 X

*Primary Examiner*—Muhammad Edun
*Attorney, Agent, or Firm*—Ronald P. Kananen; Rader, Fishman & Grauer

[57] ABSTRACT

A recording/reproducing apparatus for an optical recording medium which is used for recording and/or reproducing information on/from the optical recording medium by irradiating the optical recording medium with a laser light using two-group objective lenses comprising at least two lenses as the first and second lenses, is provided so as to comprise a light source emitting the laser light, the first lens for focusing the laser light emitted from the light source, the second lens arranged between the first lens and the optical recording medium, and a device for moving both the first and second lenses relative to each other to change the distance between them in the optical axis direction of the laser beam, so that the moving device moves the second lens to change the distance between the first and second lenses. Consequently, this invention can provide the recording/reproducing apparatus with a larger numerical aperture (NA) and reduce the influence of spherical aberration on the light beam to realize high density recording/reproducing of information signals.

25 Claims, 8 Drawing Sheets

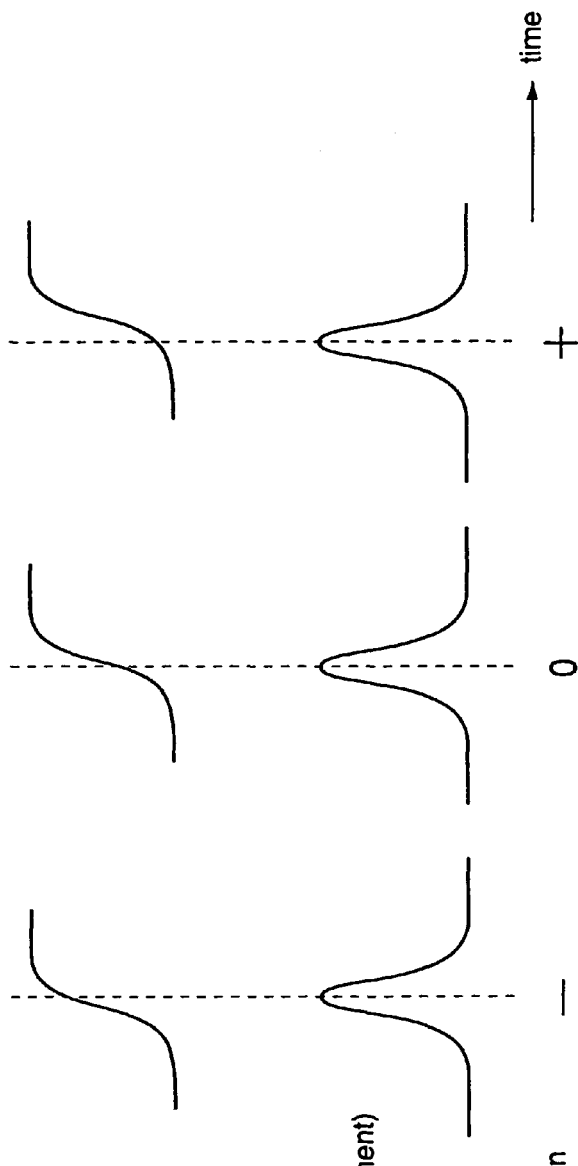

RECORDING/REPRODUCING APPARATUS AND RECORDING/REPRODUCING METHOD FOR OPTICAL RECORDING MEDIA

BACKGROUND OF THE INVENTION

This invention relates to a recording/reproducing apparatus and a recording/reproducing method for optical recording media, particularly to a recording/reproducing apparatus and a recording/reproducing method for recording and/or reproducing information on/from each of said optical recording media via two types of lenses (two-group objective lenses).

In order to increase the recording density of an optical disk, it is necessary to narrow the pitch between marks for recording information and reduce the size of the optical spot (hereafter, to be referred to as the spot simply). The optical spot size can be represented by $\lambda/(2NA)$ if the object light beam wave length is defined as $\lambda$ and the objective lens numerical aperture as NA. If the light beam wave length $\lambda$ is fixed, therefore, the larger the numerical aperture NA becomes, the smaller the spot size becomes.

The optical disk apparatus that is put to practical use at present uses a single objective lens and its numerical aperture (NA) is limited to 0.6 for the manufacturing reason of the aspheric surface lens used as the objective lens.

To cope with this problem, a method was proposed, for example, by S. M. Mansfield, W. R. Studenmund, and K. Osato in "High-Numerical-Aperture Lens System for Optical Storage", Opt, Left. 18, 305–307 (1193)" for forming two-group objective lenses using two lenses so that the numeric aperture NA can exceed 0.8. Another method for using a solid immersion lens was also disclosed in U.S. Pat. No. 5,125,750.

If such two-group lenses are used, however, the air gap between one of the lenses, which is closer to an optical disk, and the optical disk itself is changed, the change causes spherical aberration to occur and accordingly deteriorate regenerated signals. In the worst case, it becomes impossible to record/reproduce information on/from the object optical disk.

When recording or reproducing information on/from another optical disk having a different thickness of light transmission substrate after locations of the two-group lenses are optimized for an optical disk having a specified substrate thickness, spherical aberration occurs due to the difference of the disk substrate and it becomes impossible recording or reproducing the information correctly.

Furthermore, if, even when recording or reproducing information on/from an optical disk having two or more recording layers that are laminated, locations of the two-group objective lenses are optimized for a specific recording layer, then the information cannot be recorded or reproduced on/from another recording surface correctly due to spherical aberration caused by a layer that separates each recording layer (ex., UV range layer).

Under such circumstances, it is an object of this invention to improve the recording density of optical disks and suppress occurrence of spherical aberration caused by using another optical disk having a different substrate thickness or by using a different recording layer of the optical disk.

SUMMARY OF THE INVENTION

The above object is accomplished by a recording/reproducing apparatus for an optical recording medium, used for recording and/or reproducing information by irradiating the optical recording media with a light beam, which comprises a light source emitting the light beam, a first lens for focusing the light beam emitted from the light source, a second lens arranged between the first lens and the optical recording medium, a first moving device for moving the first and second lenses in the optical axis direction of the light beam, and a second moving device for moving one of said first and second lenses in the optical axis direction of said light beam relatively to the other lens.

Each of the first and second lenses can be held by a lens holder that is movable in the optical axis direction of the light emitted from the light source and in the direction perpendicular to the optical axis. A lens holder for holding said first and second lenses can be provided with the second moving device so that the second lens is held so as to be movable in the optical axis direction relatively to the first lens.

The second lens can be made to have a substantially flat surface on one side facing the recording medium and a specified curved surface on the other side facing the first lens. The second moving device can be designed to move the second lens in the optical axis direction of the light beam so as to keep a specified distance between the second lens and a recording layer of the optical recording medium.

The apparatus may further comprise a controller for controlling the second moving device so that spherical aberration of the light beam does not exceed the Marechal's Criterion on the recording layer of the optical recording medium.

The controller may control the second moving device according to a detection result of a returning light beam reflected from the optical recording medium. The controller may also control the second moving means according to a reproduced RF signal detected in the returning light beam reflected from said optical recording medium. Moreover, the controller may control the second moving device according to a value of a focus error signal when an envelope of the reproduced RF signal detected from the returning light beam reflected from the optical recording medium becomes sufficiently large in moving the first and second lenses by the first moving device.

The optical recording medium can be a multiple-layer optical disk having a plurality of recording layers.

The apparatus may further comprise a device for applying a magnetic field to a focusing point of the light beam focused on the optical recording medium via the first and second lenses.

The object can be accomplished also by a recording/reproducing apparatus comprising a light source emitting a light beam, a first lens for focusing the light beam emitted from the light source, a second lens arranged between the first lens and the optical recording medium, lens holders for holding the first and second lenses, a first moving device for moving each of the lens holders in the optical axis direction of the light beam and in the direction perpendicular to the optical axis, and a second moving device provided on each of the lens holder. The second moving device holds the second lens and moves the second lens in the optical axis direction of the light beam relatively to the first lens.

In addition, the above object can be accomplished further by a recording/reproducing method for an optical recording medium, used for recording and/or reproducing information on/from said optical recording medium by irradiating the optical recording medium with a light beam via two-group lenses comprising a first lens for focusing the light beam emitted from a light source and a second lens arranged between the first lens and the optical recording medium, which method comprises the step of generating a light beam for irradiating said optical recording medium via said first and second lenses, the first moving step of driving first moving device for moving the first and second lenses in the optical axis direction of the light beam, and the second moving step of driving second moving device for moving one of the first and second lenses in the optical axis direction of the light beam relatively to the other lens. The first and second lenses can be moved from initial positions thereof in the first moving step. Moreover, the second lens can be moved from initial position thereof set relatively to said first lens in the second moving step. The first moving step may further comprise the steps of detecting a light reflected from the optical recording medium, and controlling the first moving device according to the detection result. Also, the second moving step may further comprise the steps of detecting a light reflected from the optical recording medium, and controlling the second moving means according to the detection result.

BRIEF DESCRIPTION OF THE DRAWINGS

FIG. 9A through FIG. 9C are diagrams showing the relationship among the focus error signal, the RF signal (low-pass elements), and spherical aberration.

DETAILED DESCRIPTION OF THE PREFERRED EMBODIMENTS

Figure 1:
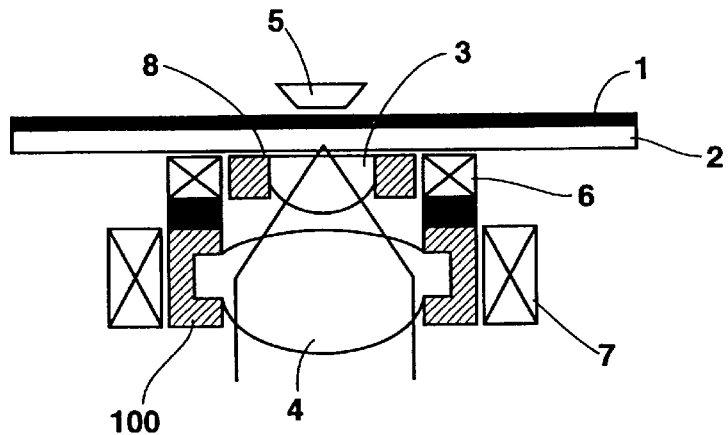
FIG. 1 shows an embodiment of a configuration of two-group objective lenses for an optical disk apparatus according to the present invention.

FIG. 1 shows a configuration of two-group objective lenses adopted for an optical disk apparatus according to the present invention. In this FIG. 1, the optical disk 1 is provided with a recording layer for recording information on the disk substrate 2 made of, for example, polycarbonate, and the like. The two-group objective lenses are two lenses; an attachment lens 3 having a flat surface on one side facing the optical disk 1 and a specified curved aspheric surface on the other side facing the objective lens 4 and an objective lens having aspheric surfaces on both sides. The attachment lens 3 may also be a solid immersion lens (SIL) comprising a flat and a spherical surface. Both the objective lens 4 and the attachment lens 3 are held by a lens holder 100 respectively.

The second actuator 6 is formed so as to move the lens 3 in the optical axis direction (A–A' line in FIG. 1) relative to the objective lens 4. According to the voltage to be applied to this second actuator 6, the gap between the attachment lens 3 and the objective lens 4 can be adjusted. The first actuator 7 is a two-axis actuator used for moving the attachment lens 3 and the objective lens 4 in the optical axis direction (focusing direction), as well as to move those lenses 3 and 4 vertically to the tracks of the optical disk 1 (in the tracking direction). According to the focus error signal and the tracking error signal supplied to this first actuator, the distance of the two-group objective lenses (attachment lens 3 and objective lens 4) from the optical disk 1 can be adjusted, as well as the laser beam can be moved perpendicularly to the optical disk tracks.

The air gap 8 is a gap between the attachment lens 3 and the optical disk 1. The width of this air gap 8 can be adjusted by the second actuator 6 or the first actuator 7.

The objective lens 4 has is a numerical aperture of about 0.45 and is used to focus the laser beam emitted from a semiconductor laser (not illustrated here) onto the attachment lens 3. The attachment lens 3 is 2.5 mm in diameter and 1.4 mm in thickness. This lens 3 is used to focus the laser beam received from the objective lens 4 on each specified point on the optical disk 1. In this attachment lens 3, the beam coming from the objective lens 4 is magnified by about 1.8, because of the power and refractivity of the lens 3. Thus, the total numerical aperture of the two-group lenses become about 0.81 (=0.45×1.8).

In this embodiment, the laser beam wave length λ is about 680 nm. If the air gap 8 is set to about 75 μm, spherical aberration $W_1$ caused by this air gap 8 can be represented by the following expression.

$$W_1 = -n^2(h/8)(n^2-1)\sin^4\theta_0 \qquad (1)$$

where h indicates the width of the air gap 8, n indicates the refractivity of the attachment lens 3, and $\sin\theta_0$ indicates the numeral aperture of the objective lens 4.

According to the expression (1), the spherical aberration $W_1$ caused by a 75 μm air gap 8 becomes as large as about 3λ(=2040 nm). In this embodiment, therefore, the spherical aberration $W_1$ caused by the air gap 8 can be canceled by adjusting the aspheric surface of the objective lens 4. In other words, the aspheric surface degree of the objective lens 4 is decided so that no aspherical aberration occurs when the air gap is 75 μm in this embodiment.

In such a configuration, the first actuator 7 can adjust the distance of the air gap 8 just like the prior art two-group objective lens, and the second actuator 6 can adjust the gap between the attachment lens 3 and the objective lens 4. If the distance between those two lenses and the air gap 8 are adjusted according to the thickness of the substrate 2 of the optical disk 1, spherical aberration occurrence can be suppressed. The reason will be described in detail below.

If, when the distance between lenses 3 and 4 is fixed just like the prior art two-group objective lens, the surface of the substrate 2 of the optical disk 1 is uneven, then focusing of the lenses is controlled automatically corresponding to the uneven surfaces of the substrate. Thus, the air gap 8 is changed automatically. In this case, if the change of this air gap is Δh, the change $\Delta W_1$ of the spherical aberration caused by Δh can be represented by the expression (2) as shown below.

$$\Delta W_1 = -n^2(\Delta h/8)(n^2-1)\sin^4\theta_0 \qquad (2)$$

For example, if the allowance of $\Delta W_1$ is λ/4 (=170 nm), the change Δh of the air gap 8 must be suppressed within about ±160±μm.

As shown in this embodiment, if the gap between two-group objective lenses is variable, the gap between the two-group objective lenses can be adjusted so that the air gap 8 is fixed to suppress occurrence of spherical aberration even when the thickness of the disk substrate 2 of the optical disk 1 changes. In other words, if the air gap 8 is fixed, the spherical aberration $W_2$ in relation to the change $\Delta t$ of the disk substrate thickness can be represented as follows when the radius of the attachment lens 3 is a (=1.25 mm) in this embodiment.

$$W_2 = n(\pm t^2/8a)\,(n-1)\sin^4\theta_0 \qquad (3)$$

If the allowance of the spherical aberration $W_2$ is $\lambda/4$, the thickness change $\Delta t$ of the disk substrate 2 becomes about ±160 μm.

Although the width of the air gap 8 is set to a fixed value in the above case, the spherical aberration $W_2$ caused by the thickness of the disk substrate 2 occurs in the opposite direction of the spherical aberration $W_1$ caused by the air gap 8 ($W_1$ and $W_2$ codes are exchanged). Thus, both $W_1$ and $W_2$ can be offset mutually by adjusting the air gap 8 appropriately to the thickness of the disk substrate 2.

Subsequently, an embodiment of this invention will be described for enabling spherical aberration $W_1$ and $W_2$ to be offset mutually by adjusting the air gap 8 and the gap between the two-group objective lenses corresponding to the thickness of the disk substrate 2.

Figure 2:
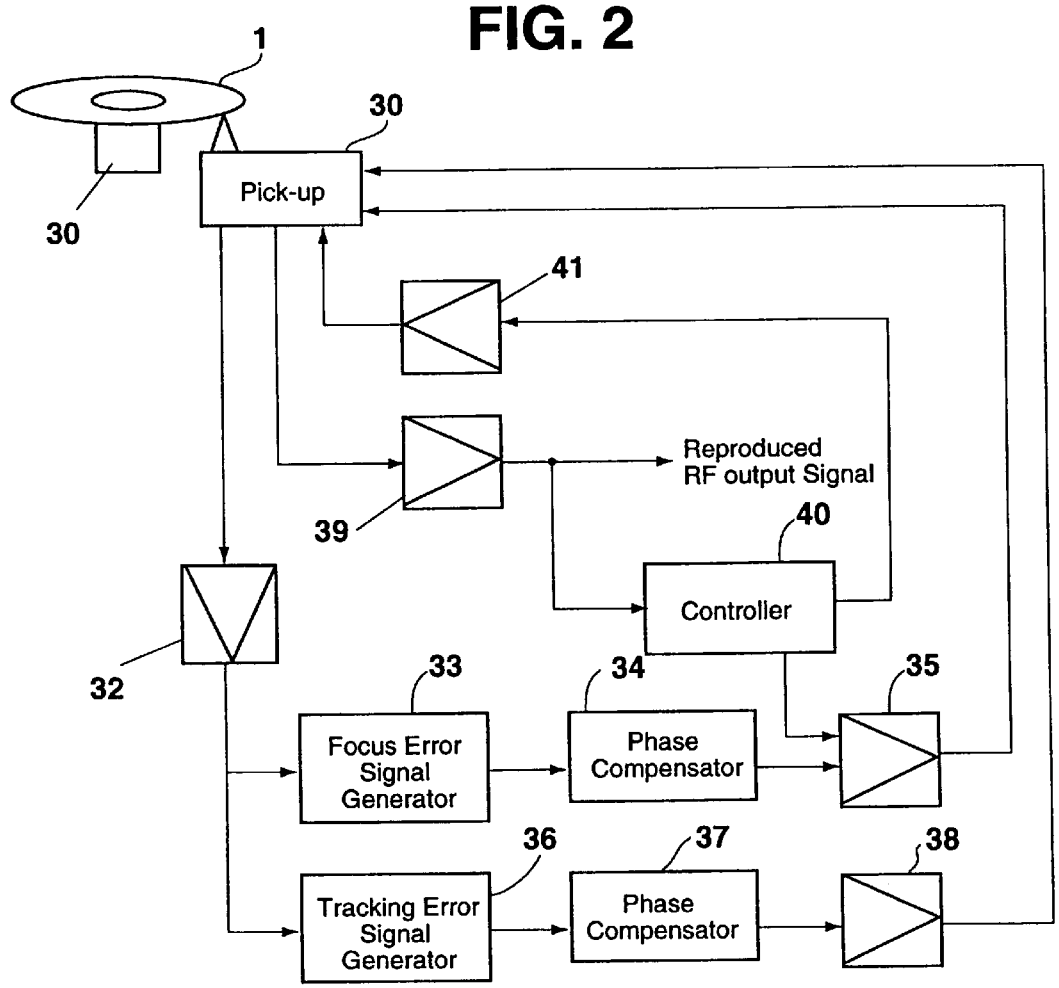
FIG. 2 is a block diagram showing an embodiment of an electrical configuration of an optical disk apparatus according to the present invention.

FIG. 2 is a block diagram showing an embodiment of an electric configuration of an optical disk apparatus according to the present invention. In this embodiment, the gap between two-group objective lenses, as well as the air gap 8 are set so as to get the maximum amplitude of the reproduced RF signal. In other words, satisfactorily smaller spherical aberration (Marechal's Criterion) means that the laser beam is emitted on the optical disk 1 in an ideal shape. In this case, therefore, the amplitude of the reproduced RF signal generated by the reflected light from the optical disk 1 becomes large.

In FIG. 2, the optical disk 1 is turned by a spindle motor 30 at a specified angular speed. The pick-up 31 emits a laser beam in a specified area on the optical disk 1 and records information as marks. The pick-up 31 also reads information recorded as marks. The servo signal output from the pick-up 31 is amplified by the servo head amplifier 32 and supplied to the focus error signal generator 33 and the tracking error signal generator 36.

The focus error signal output from the focus error signal generator 33 is supplied to the phase compensator 34. The phase compensator 37 compensates the phase characteristics of the tracking error signal output from the tracking error signal detector 36. The signals output from phase compensators 34 and 37 are supplied to amplifiers 35 and 38, respectively, so as to be amplified with a specified gain, then supplied to the first actuator 7 of the pick-up 31 and used for controlling focusing and tracking.

The amplifier 35 selects the output of the phase compensator 34 as an input signal in the normal status (when the focus servo is locked), but when a focus servo pulling-in signal is output from the controller 40, the phase compensator 34 is connected to the controller 40 and selects the focus servo pulling-in signal as an input signal.

The RF signal output from the pick-up 31 is entered to the RF head amplifier 39 and amplified with a specified gain, then supplied to the controller 40 (controlling means) as a reproduced RF signal. The RF signal is also entered to a decoder (not illustrated here) and decoded to regenerate original information.

The controller 40 generates the attachment lens control signal (to be described later) used to decide the gap between the two-group objective lenses according to the reproduced RF signal supplied from the RF head amplifier 39 and supplies the signal to the amplifier 41. The amplifier 41 amplifies the attachment lens control signal with a specified gain and supplies the signal to the second actuator 6 built in the pick-up 31. Consequently, the gap between the attachment lens 3 and the object lens 4 can be adjusted to the optimized value.

Figure 3:
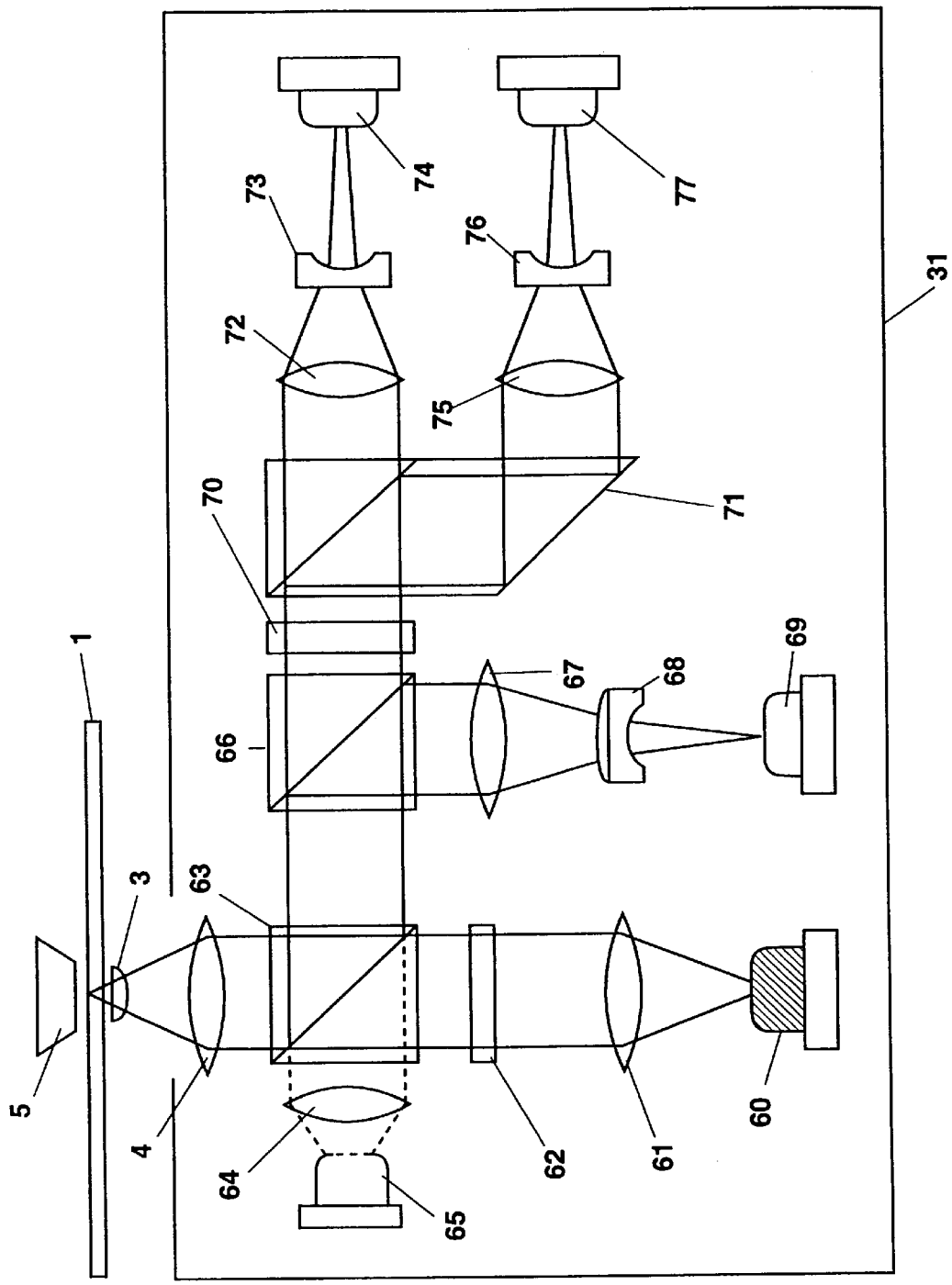
FIG. 3 is a diagram showing a detailed configuration of an example of the pick-up 31 shown in FIG. 2.

FIG. 3 shows an example of a configuration of a pick-up 31. In this FIG. 3, the semiconductor laser 60 emits a red laser beam having a wave length of 680 nm to focus the beam on a specified spot on a recording layer of the optical disk 1 via a collimated lens 61, a diffraction grating 62, a beam splitter 63, an objective lens 4, and an attachment lens 3. The reflected light from the optical disk 1 is entered to the beam splitter 63 via the attachment lens 3 and the objective lens 4 again, so that part of the p-polarized contents (ex., 30% of the p-polarized contents) and all s-polarized contents are extracted from the light and entered to the beam splitter 66. The beam splitter 66 supplies most of the rest of the reflected light to the polarized beam splitter 71 via a half-wave plate 70. The polarized beam splitter 71 polarizes and separates s-polarized contents from p-polarized contents so as to be supplied to the lenses 72 and 75 respectively.

The laser beam output from the beam splitter 66 and supplied to the lens 67 is then supplied to a photodiode 69 via a lens 68 that allows the beam to make an astigmatism and be converted to an electric signal corresponding to the beam strength. The electric signal is then supplied to a servo amplifier 32 (FIG. 2) as a servo signal. On the other hand, the laser beam output from the polarized beam splitter 71 is supplied to the photodiodes 74 and 77 via lenses 72, 73, 75, and 76, respectively. Photodiodes 74 and 77 convert the supplied laser beam to corresponding electric signals and output the signals. The electric signals output from the photodiodes 74 and 77 are differential-amplified and output to the RF head amplifier 39 (FIG. 2) as reproduced RF signals.

Part of the laser beam emitted from the semiconductor 60 and supplied to the beam splitter 63 via the lens 61 and the diffraction grating 62 is reflected by the beam splitter 63 and supplied to the photodiode 65 via the lens 64. The photodiode 65 converts the supplied laser beam to the corresponding electric signal and outputs the signal. The signal output from the photodiode 65 is supplied to an APC (Automatic Power Control) circuit (not illustrated) and according to this signal, the power of the laser beam emitted from the semiconductor laser 60 is controlled so as to be fixed at a level.

The magnetic head 5 applies an external magnetic field to a specified spot on the optical disk 1 on which a recording laser beam is irradiated. The recording laser beam is more powerful than the reproducing laser beam.

Figure 4:
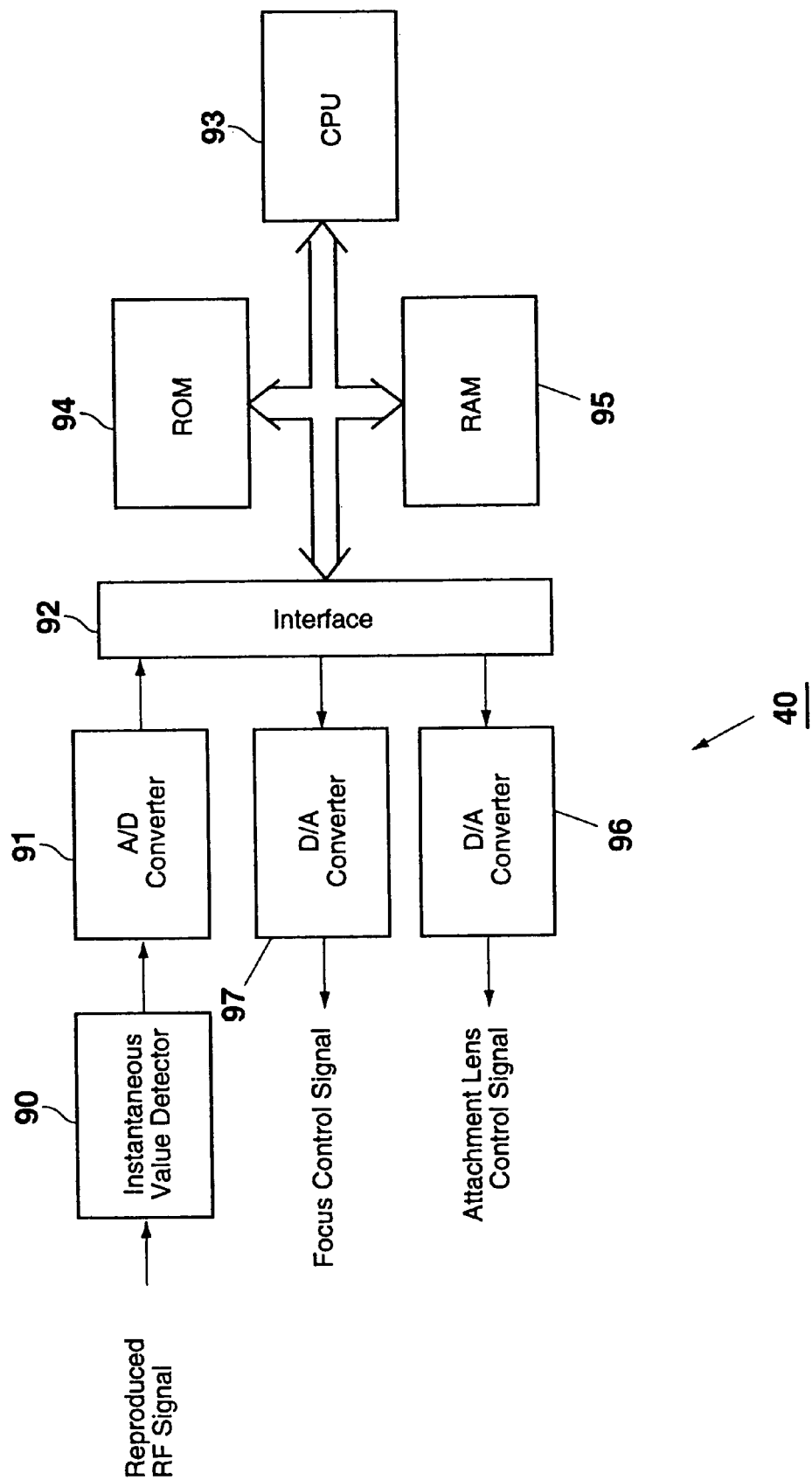
FIG. 4 is a block diagram showing a detailed configuration of the controller 40 shown in FIG. 2.

FIG. 4 is a block diagram showing an example of a detailed configuration of the controller 40 shown in FIG. 2. In this FIG. 4, the reproduced RF signal output from the RF head amplifier 39 shown in FIG. 2 is supplied to the instantaneous value detector 90, so that the signal instantaneous value is detected. The A/D converter 91 converts the analog signals output from the instantaneous value detector 90 to digital signals and supplies the digital signals to the CPU 93 via an interface 92.

The CPU 93 reads the instantaneous value of the digitized reproduced RF signal to decide the optimized value of the gap between the attachment lens 3 and the objective lens 4 according to a specified control program (to be described later) stored in the ROM 94. The CPU 93 then outputs the obtained optimized value (digital data) to the D/A converter 96 via the interface 92. The D/A converter 96 converts the optimized value to analog data and supplies the data to the amplifier 41 (FIG. 2) as an attachment lens control signal.

The RAM 95 stores data and operation results generated when the CPU 93 executes a control program, stored in the ROM 94, temporarily. The D/A converter 97 converts data output from the CPU 93 so that the CPU 93 can control the actuator 7 directly when in pulling in the focus servo, and other processings. The D/A converter 97 outputs converted analog signals as focus control signals.

Figure 5:
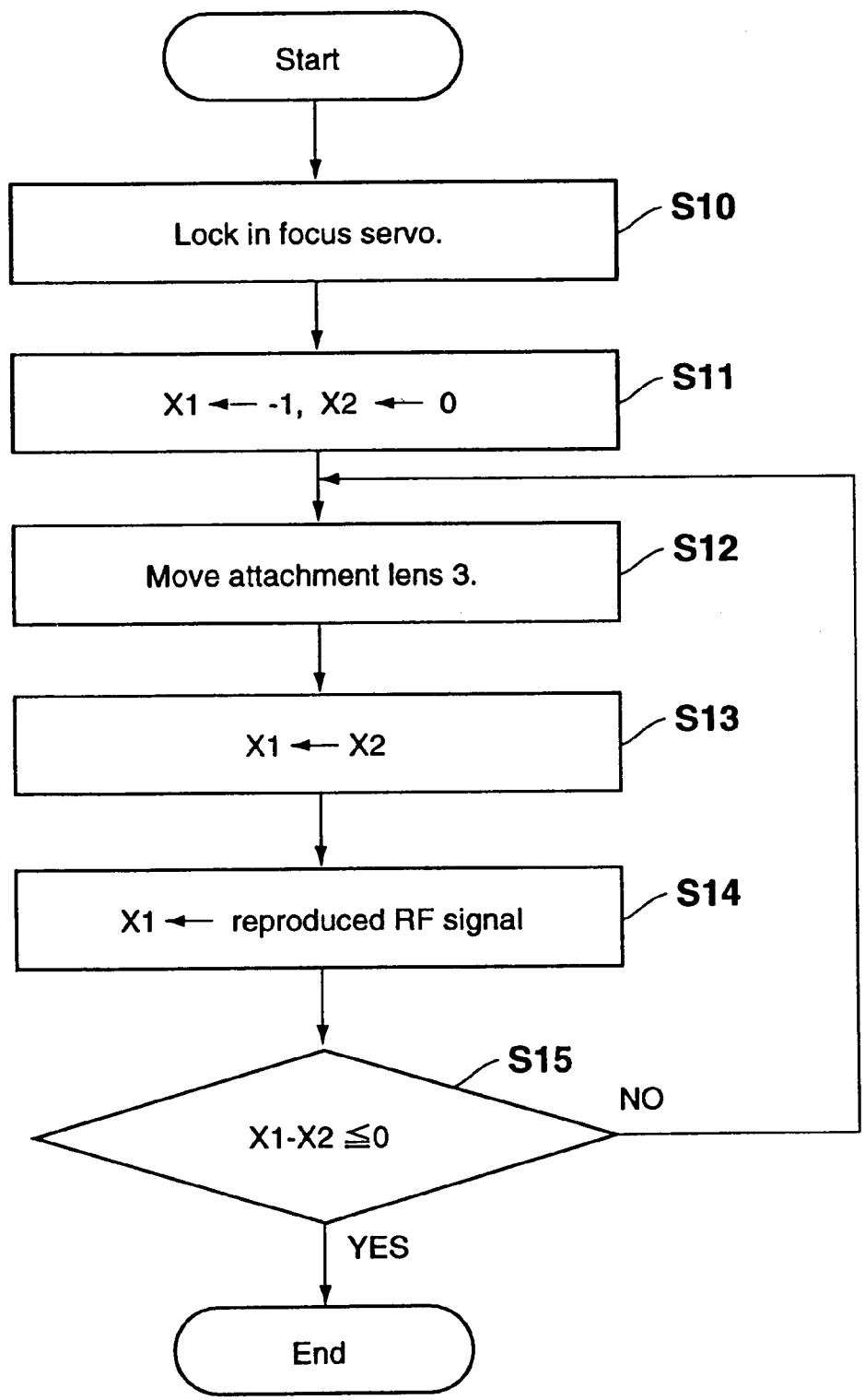
FIG. 5 is a flow chart showing an example of a processing executed by the CPU 93 shown in FIG. 4.

FIG. 5 shows an example of a processing (control program described above) executed by the CPU 93 provided in the controller 40 in the above configuration. This processing is executed when an optical disk 1 is loaded in the optical disk apparatus. This processing adjusts the gap between two-group objective lenses according to the thickness of the disk substrate 2 of the optical disk 1 so as to minimize spherical aberration (under Marechal's Criterion).

In step S10 in FIG. 5, the CPU 93 sends a focus control signal to the amplifier 35 to have the focus servo pulled in, then lock the focus servo. In other words, the CPU 93 controls the first actuator 7 shown in FIG. 1 to move both the attachment lens 3 and the objective lens 4 from their initial positions (furthest from to the optical disk 1) to a range in which the focus servo (a focus servo system comprising the focus error signal generator 33, the phase compensator 34, the amplifier 35, and the first actuator 7) can operate normally and start the focus servo. Then, the focus servo begins the optimized control of the laser beam to be emitted on the optical disk 1, so that the laser beam is always focused in the optimized status (focus servo locked status). Consequently, reproducing of information from the optical disk 1 is started, and the RF signal is supplied to the decoder (not illustrated here) and the controller 40 via the head amplifier 39.

In the next step S11, the CPU 93 sets "−1" in the variable X1 used for saving the value of a read reproduced RF signal and "0" in the variable X2 used for saving the value of the reproduced RF signal read in the previous processing (loop) as initial values. The system then goes to step S12, and the CPU 93 supplies specified data to the D/A converter 96 to move the attachment lens 3 by a specified distance from the position closest to the optical disk 1.

In other words, the distance on which the attachment lens 3 can move is divided equally into 255 sections and a value within 0 to 255 is assigned sequentially to each of those equally divided sections of the distance, beginning at the position furthest from the optical disk 1. Then, if the CPU 93 outputs any value within 0 to 255 to the D/A converter 96, the D/A converter 96 generates a voltage (D/A conversion) corresponding to the supplied value and outputs the voltage to the amplifier 41. The amplifier 41 amplifies the received voltage with a specified gain, then outputs the result to the second actuator 6. As a result, the second actuator 6 moves the attachment lens 3 to a position corresponding to the value within 0 to 255 output from the CPU 93. Thus, in step S12, the CPU 97 outputs data (0 to 255) corresponding to the processing count (loop count) to the D/A converter 96.

In the next step S13, the CPU 93 transfers the value set in X1 into X2. As a result, the value of the reproduced RF signal read in the previous processing and saved in X1 is transferred to X2.

In step S14, the CPU 93 reads the instantaneous value of the reproduced RF signal detected by the instantaneous value detector 90 and converted from analog to digital in the A/D converter 91 and sets the value in X1. After this, the system goes to step S15, the CPU 93 judges whether or not the value of X1 minus X2 is less than "0" or equal to "0". If judged more than "0" (NO), the CPU 93 returns to S12 to repeat the same processings in and after S12. If judged less than "0" or equal (YES), the CPU 93 ends the processing (END).

For example, if an optical disk whose substrate 2 has a thickness of 0.6 mm is loaded in the optical disk apparatus, the focus servo is locked in step S10. Then, in step S13, the attachment lens 3 positioned at the initial position (="0" position) is moved by a specified distance (moved to "1" position), then the value obtained by subtracting the reproduced RF signal instantaneous value (value saved in X2 ("−1" in the first loop)) read in the previous processing (loop) from the instantaneous value (value saved in X1) of the reproduced RF signal read this time is compared with "0" in step S15. If the value of X1 minus X2 is judged to be larger than "0" (NO), (that is, when the reproduced RF signal amplitude is judged not to be the maximum value), the CPU 93 returns to step S12 to repeat the same processings in and after S12. (The same processings are repeated for positions in and after "2".) If the value of X1 minus X2 is judged to be smaller than "0" or equal to "0" (X1−X2≦0), (that is, when the reproduced RF signal amplitude is the maximum or a little over the maximum value), the CPU 93 ends the processing.

As a result, an optimized distance between the two-group objective lenses can be assured for the loaded optical disk having a substrate thickness of 0.6 mm. After this processing is executed, the attachment lens 3 is fixed at the position corresponding to this optimized value.

According to the embodiment described above, the gap between the two-group objective lenses can be set so as to minimize spherical aberration, so that information can be recorded/reproduced correctly on/from optical disks, each of which has a different substrate thickness from others.

In the embodiment described above, the gap between the two-group objective lenses is set in reference to the position where the reproduced RF signal instantaneous value becomes the maximum. However, for example, the reference position may be a position where the optimized jittering value can be obtained for the reproduced signal. In other words, if spherical aberration is satisfactorily small, idealistic reproduced signals can be obtained, so the jittering values of those reproduced signals become the minimum. In a word, it is only needed to use a signal indicating an ideal RF signal.

Figure 6:
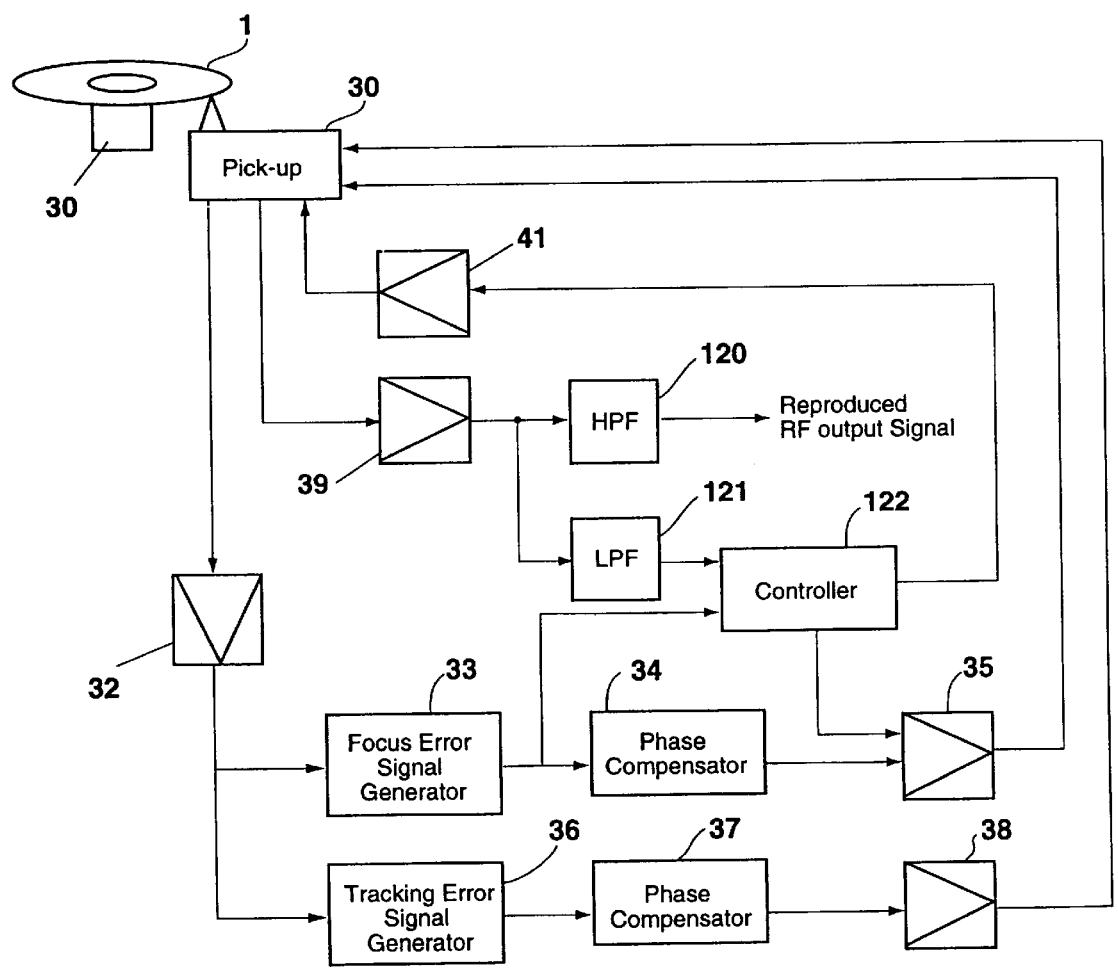
FIG. 6 is a block diagram showing another embodiment of the electrical configuration of an optical disk apparatus according to the present invention.

FIG. 6 is a block diagram showing another embodiment of an electrical configuration of an optical disk apparatus according to the present invention. In this FIG. 6, the same numerals will be given to the same items as those in FIG. 2 avoiding redundant explanation.

In this FIG. 6, a high-pass filter (HPF) 120, a low-pass filter (LPF) 121, and a controller 122 (controlling means) are newly provided to the optical disk apparatus. Other items are the same as those in FIG. 2.

The output of the RF head amplifier 39 is supplied to the high-pass filter 120 and the low-pass filter 121. The high-pass filter 120 extracts only high frequency contents (signal contents including information recorded on a recording medium 1) of the output from the RF head amplifier 39 and supplies the high frequency contents to a decoder (not illustrated here) as a reproduced RF signal. The low-pass filter 121 extracts only low frequency contents (envelope contents of recorded information) of the output from the RF head amplifier 39 and supplies those low frequency contents to the controller 122 as an envelope signal.

Figure 7:
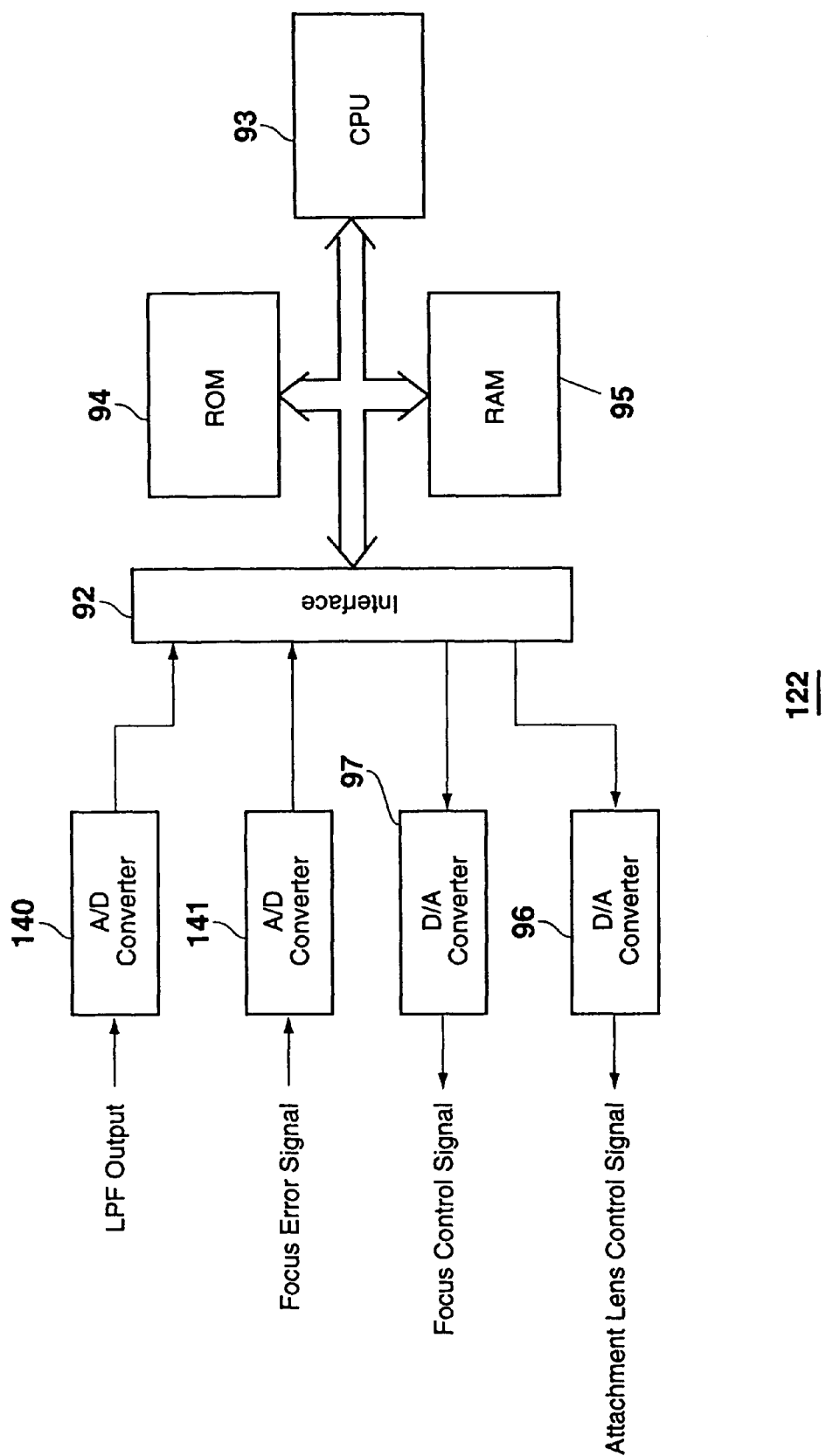
FIG. 7 is a block diagram showing an example of a detailed configuration of the controller 122 shown in FIG. 6.

FIG. 7 is a block diagram for a detailed configuration of the controller 122. In this FIG. 7, the same numerals are given to the same items as those in FIG. 4 avoiding redundant explanation.

In this FIG. 7, the instantaneous value detector 90 and the A/D converter 91 are replaced with A/D converters 140 and 141. Other items are the same as those in FIG. 4.

The envelope signal output from the low-pass filter 121 is entered to the A/D converter 140. The A/D converter 140 converts the entered envelope signal (analog) to a digital signal and supplies the digital signal to the CPU 93 via the interface 92. The A/D converter 141 converts the focus error signal output from the focus error signal generator 33 to a digital signal and supplies the digital signal to the CPU 93 via the interface 92.

Figure 8:
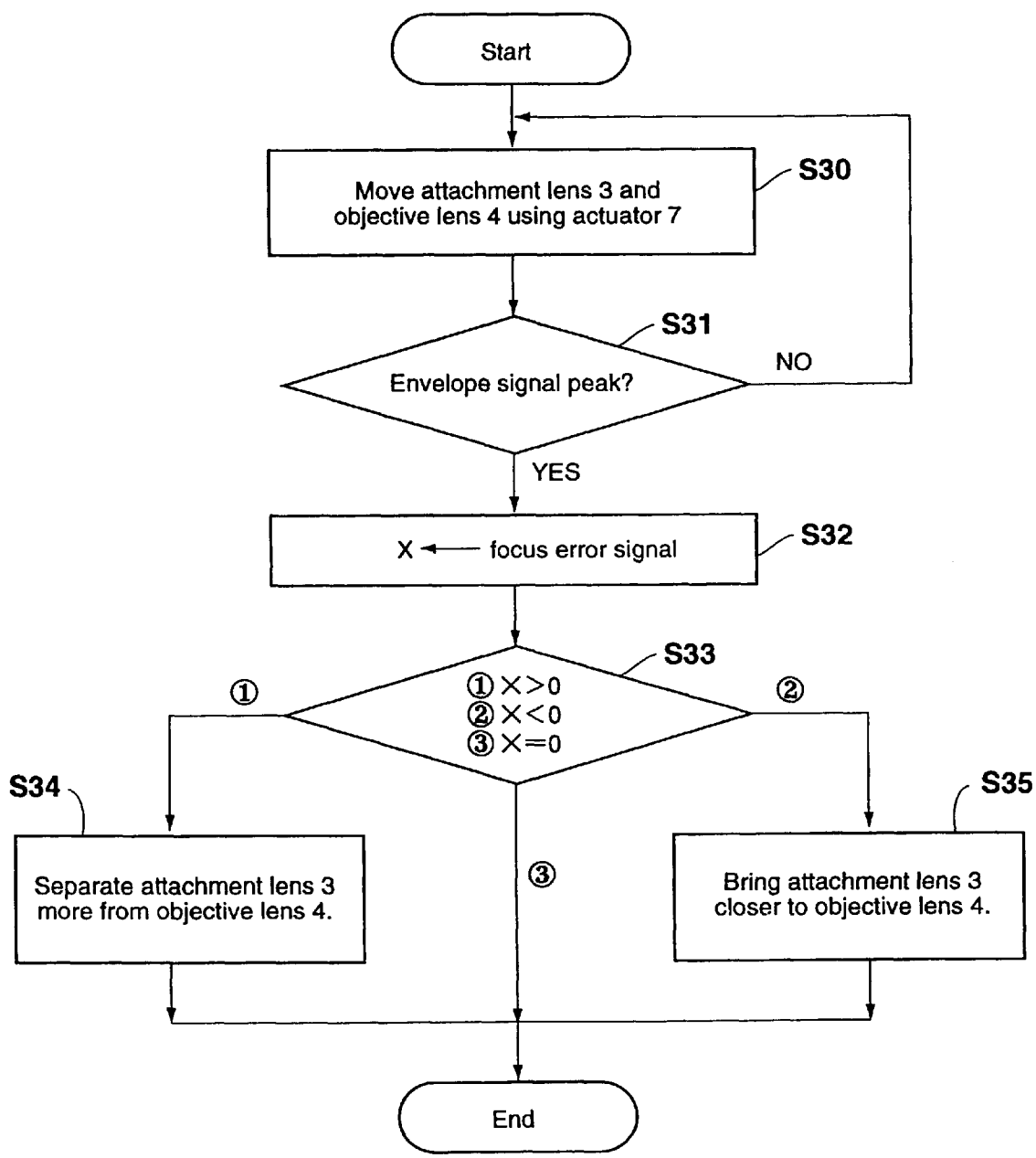
FIG. 8 is a flow chart showing an example of a processing executed by the CPU 93 shown in FIG. 7.

FIG. 8 is a flow chart for a processing executed by the CPU 93 provided in the controller 122 shown in FIG. 7. This processing, just like the processing shown in FIG. 5, is executed when an optical disk 1 is loaded in the optical disk apparatus.

Before explaining this processing, how to detect spherical aberration in this processing will be described below with reference to FIG. 9A to FIG. 9C.

FIG. 9A to FIG. 9C shows the relationship between the focus error signal and the envelope signal detected when the attachment lens 3 and the objective lens 4 (two-group objective lenses) shown in FIG. 1 are moved by the first actuator 7 to positions where those two lenses are put closest to the optical disk 1 from the furthest positions from the disk 1 after the gap between those lenses 3 and 4 is set properly. In this case, the gap between the two-group objective lenses is optimized to the thickness of the disk substrate 2 of the optical disk 1. And, if spherical aberration (FIG. 9C) is "0", then the focus error signal (FIG. 9A) takes an intermediate value between maximum and minimum values (usually "0") when the envelope signal (FIG. 9B) meets its peak (the time indicated by a broken line in FIG. 9A to FIG. 9C).

However, if the gap between two-group objective lenses is not proper to the thickness of the disk substrate 2 and negative (−) spherical aberration occurs (as shown in the left-end graph in FIG. 9A to FIG. 9C), the focus error signal takes a value closer to the maximum value when the envelope signal (FIG. 9B) meets its peak.

If the gap between two-group objective lenses is not proper to the thickness of the disk substrate 2 and positive (+) spherical aberration occurs (as shown in the right-end graph in FIG. 9A to FIG. 9C), the focus error signal takes a value closer to the minimum value when the envelope signal (FIG. 9B) meets its peak.

Consequently, it is possible to judge whether or not spherical aberration occurs by driving the first actuator to detect the maximum value of the envelope signal and checking the value of the focus error signal at that time.

If a processing shown in FIG. 8 is executed, the CPU 93 supplies data to the D/A converter 97 via the interface 92 in step S30 to change the voltage to be applied to the actuator 7, so that both the attachment lens 3 and the objective lens 4 are moved by a specified distance (ex., a distance obtained by dividing the distance on which both lenses 3 and 4 are moved by the first actuator into 255 equal sections). In step S31, the CPU 93 reads the envelope signal from the A/D converter 140 to judge whether or not the envelope signal reaches the peak value.

In other words, in step S30 and S31, a distance on which both lenses 3 and 4 can be moved by the first actuator 7 is equally divided into 255 sections and each divided section is assigned to a value within 0 to 255 sequentially, beginning at the position where the pick-up 31 is separated furthest from the optical disk 1 (initial position of the actuator 7). Then, the CPU 93 outputs "1" to the D/A converter 97 in the first processing (loop) to move the initial position of the first actuator (position corresponding to "0") to the position corresponding to "1". After this, the CPU 93 checks again whether or not the envelope signal has reached its peak value.

In step S31, if the CPU 93 judges that the envelope signal has reached its peak value (YES), the system goes to step S32. If the envelope signal is judged not to have reached its peak value (NO), the system returns to step S30, where the CPU 93 increases the value to be output to the D/A converter 97 by one and repeats the same processings as above.

If the CPU 93 judges that the envelope signal has reached its peak value, the system goes to step S32, where the CPU 93 reads the focus error signal from the A/D converter 141 via the interface 92 and saves the read value in the variable X.

If the focus error signal value saved in X is judged to be larger than "0" (intermediate value between maximum and minimum values of the focus error signal) (corresponding to the left-end graph in FIG. 9A to FIG. 9C) in step S33, the system goes to step S34, where the CPU 93 reads data corresponding to the focus error signal value from the conversion table stored in the ROM 94 and supplies the data to the D/A converter 96. The D/A converter 96 applies a voltage corresponding to the supplied data to the second actuator 6, so that the attachment lens 3 is moved in the direction so as to be put closer to the optical disk 1. As a result, the gap between two-group objective lenses is separated more. After this, the CPU 93 ends the processing (END).

If the focus error signal value saved in X is judged to be smaller than "0" (corresponding to the right-end graph in FIG. 9A to FIG. 9C) in step S33, the system goes to step S35, where the CPU 93 reads data corresponding to the focus error signal value from the conversion table stored in the ROM 94 and supplies the data to the D/A converter 96. The D/A converter 96 applies a voltage corresponding to the supplied data to the second actuator 6, so that the attachment lens 3 is moved in the direction so as to be separated further from the optical disk 1. As a result, the gap between two-group objective lenses is narrowed. After this, the CPU 93 ends the processing (END).

Furthermore, if the value of the focus error signal saved in X is "0" (center graph in FIG. 9A to FIG. 9C), the gap between the two-group objective lenses is judged proper, and the CPU 93 ends the processing (END).

According to the embodiment described above, the gap between the two-group objective lenses can be adjusted to minimize the spherical aberration for each optical disk 1, so optical disks 1, each of which has a different substrate thickness from others, can be used for one optical disk apparatus.

In the above embodiment, optical disks 1, each of which has a different substrate thickness from others are used. However, this invention can also apply to multiple-layer optical disks, each of which has two or more layers for recording information, for example.

In such a case, when a multiple-layer optical disk is loaded in the optical disk apparatus, the processings shown in FIG. 5 or FIG. 8 are executed to find the optimized gap between two-group objective lenses for each of those recording layers. Then, if, when information is to be recorded or reproduced, the laser beam must move from layer to layer, then the gap between two-group objective lenses can be set to the one found when the disk is loaded, so that the laser beam can be irradiated to each recording layer without spherical aberration to record or reproduce information.

Furthermore, although the attachment lens 3 is moved in the optical axis direction relative to the objective lens 4 to adjust the relative distance between the attachment lens 3 and the objective lens 4 in this embodiment, the objective lens 4 may also be moved by the second actuator 6 in the optical axis direction relative to the attachment lens 3. The second actuator may assume a configuration that uses a magnet and a coil or a configuration that uses an ultrasonic wave motor or a stepping motor. Any of those apparatuses may be selected as needed to realize the second actuator.

What is claimed is:

1. A recording/reproducing apparatus for an optical recording medium, used for carrying out at least one of information recording and reproducing by irradiating said optical recording medium with a light beam, said apparatus comprising:

a light source emitting a light beam;

a first lens for focusing the light beam emitted from said light source;

a second lens arranged between said first lens and the optical recording medium;

first moving means for moving said first and second lenses in an optical axis direction of the light beam; and second moving means for moving one of said first and second lenses in the optical axis direction of the light beam relative to the other lens.

2. A recording/reproducing apparatus for an optical recording medium as defined in claim 1, wherein each of said first and second lenses is held by a lens holder that is movable (1) in the optical axis direction of the light beam emitted from said light source and (2) in a direction perpendicular to the optical axis.

3. A recording/reproducing apparatus for an optical recording medium as defined in claim 1, wherein said lens holder for holding said first and second lenses is provided with said second moving means so that said second lens is held so as to be movable in the optical axis direction relative to said first lens.

4. A recording/reproducing apparatus for an optical recording medium as defined in claim 1, wherein said second lens has a substantially flat surface on one side facing the recording medium and a specified curved surface on the other side facing said first lens.

5. A recording/reproducing apparatus for an optical recording medium as defined in claim 1, wherein said second moving means moves said second lens in the optical axis direction of said light beam so as to keep a specified distance between said second lens and a recording layer of the optical recording medium.

6. A recording/reproducing apparatus for an optical recording medium as defined in claim 1 further comprising:

controlling means for controlling said second moving means so that spherical aberration of the light beam does not exceed Marechal's Criterion on the recording layer of the optical recording medium.

7. A recording/reproducing apparatus for an optical recording medium as defined in claim 6, wherein said controlling means controls said second moving means according to a detection result of a returning light beam reflected from the optical recording medium.

8. A recording/reproducing apparatus for an optical recording medium as defined in claim 6, wherein said controlling means controls said second moving means according to a reproduced RF signal detected in the returning light beam reflected from the optical recording medium.

9. A recording/reproducing apparatus for an optical recording medium as defined in claim 6, wherein said controlling means controls said second moving means according to a value of a focus error signal when an envelope of the reproduced RF signal detected in the returning light beam reflected from the optical recording medium becomes sufficiently large in moving said first and second lenses by said first moving means.

10. A recording/reproducing apparatus for an optical recording medium as defined in claim 6, wherein the optical recording medium is a multiple-layer optical disk having a plurality of recording layers.

11. A recording/reproducing apparatus for an optical recording medium as defined in claim 6 further comprising:

means for applying a magnetic field to a focusing point of the light beam focused on the optical recording medium via said first and second lenses.

12. A recording/reproducing apparatus for an optical recording medium, used for carrying out at least one of information recording and reproducing by irradiating said optical recording media with a light beam, said apparatus comprising:

a light source emitting a light beam;

a first lens for focusing the light beam emitted from said light source;

a second lens arranged between said first lens and the optical recording medium;

lens holders for holding said first and second lenses;

first moving means for moving each of said lens holders in an optical axis direction of the light beam and in a direction perpendicular to the optical axis; and second moving means provided on each of said lens holders, said second moving means holding said second lens and moving said second lens in the optical axis direction of the light beam relative to said first lens.

13. A recording/reproducing apparatus for an optical recording medium as defined in claim 12, wherein said second lens has a substantially flat surface on one side facing the recording medium and a specified curved surface on the other side facing said first lens.

14. A recording/reproducing apparatus for an optical recording medium as defined in claim 12, wherein said second moving means moves said second lens in the optical axis direction of the light beam so as to keep a specified distance between said second lens and a recording layer of said optical recording medium.

15. A recording/reproducing apparatus for an optical recording medium as defined in claim 12 further comprising:

controlling means for controlling said second moving means so that spherical aberration of the light beam does not exceed Marechal's Criterion on a recording layer of the optical recording medium.

16. A recording/reproducing apparatus for an optical recording medium, as defined in claim 15, wherein said controlling means controls said second moving means according to a detection result of a returning light beam reflected from the optical recording medium.

17. A recording/reproducing apparatus for an optical recording medium as defined in claim 15, wherein said controlling means controls said second moving means according to a reproduced RF signal detected in the returning light beam reflected from the optical recording medium.

18. A recording/reproducing apparatus for an optical recording medium as defined in claim 15, wherein said controlling means controls said second moving means according to a value of a focus error signal when an envelope of the reproduced RF signal detected in the returning light beam reflected from the optical recording medium becomes sufficiently large in moving said first and second lenses by said first moving means.

19. A recording/reproducing apparatus for an optical recording medium as defined in claim 12, wherein the optical recording medium is a multiple-layer optical disk having a plurality of recording layers.

20. A recording/reproducing apparatus for an optical recording medium as defined in claim 12 further comprising:

means for applying a magnetic field to a focusing point of the light beam focused on the optical recording medium via said first and second lenses.

21. A recording/reproducing method for an optical recording medium, used for carrying out at least one of information recording on and reproducing from the optical recording medium by irradiating said optical recording medium with a light beam via two-group lenses comprising a first lens for focusing the light beam emitted from a light source and a second lens arranged between said first lens and the optical recording medium, said method comprising:

a step of generating a light beam for irradiating the optical recording medium via said first and second lenses;

a first moving step of driving first moving means to move said first and second lenses in an optical axis direction of the light beam; and a second moving step of driving second moving means to move one of said first and second lenses in the optical axis direction of the light beam relative to the other lens.

22. A recording/reproducing method as defined in claim 21, wherein said first and second lenses are moved from initial positions thereof in said first moving step.

23. A recording/reproducing method as defined in claim 21, wherein said second lens is moved from an initial position thereof set relative to said first lens in said second moving step.

24. A recording/reproducing method as defined in claim 21, wherein said first moving step further comprises the steps of detecting a light reflected from the optical recording medium, and controlling said first moving means according to the detection result.

25. A recording/reproducing method as defined in claim 21, wherein said second moving step further comprises the steps of detecting a light reflected from the optical recording medium, and controlling said second moving means according to the detection result.

* * * * *